Feb. 19, 1963    L. J. JELSCH    3,078,103
ISOLATED CHASSIS FRAME MEMBER FOR A VEHICLE
Filed Jan. 4, 1960    2 Sheets-Sheet 1
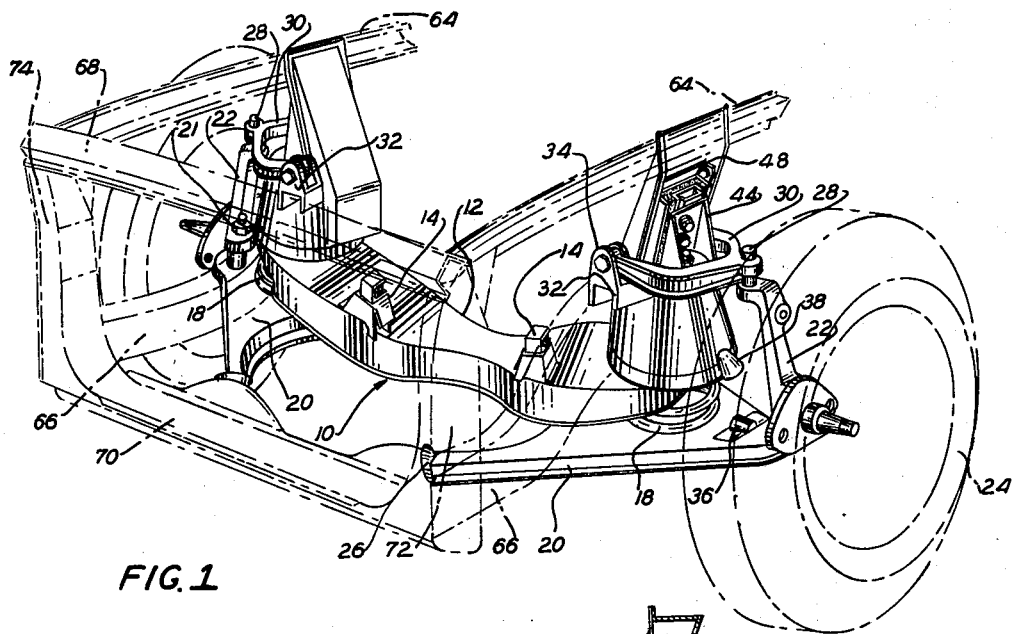
FIG. 1
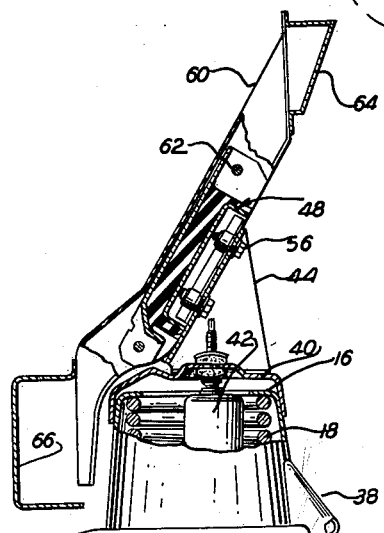
FIG. 2
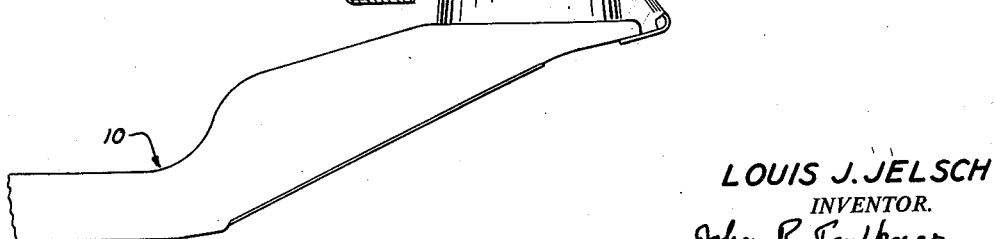
LOUIS J. JELSCH
INVENTOR.
BY John R. Faulkner
Clifford L. Sadler
ATTORNEYS Feb. 19, 1963  L. J. JELSCH  3,078,103
ISOLATED CHASSIS FRAME MEMBER FOR A VEHICLE
Filed Jan. 4, 1960  2 Sheets-Sheet 2
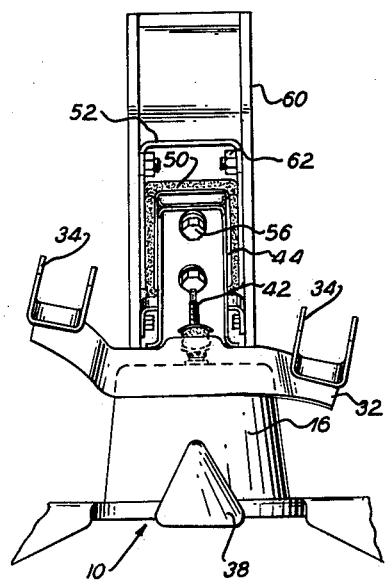
FIG.3
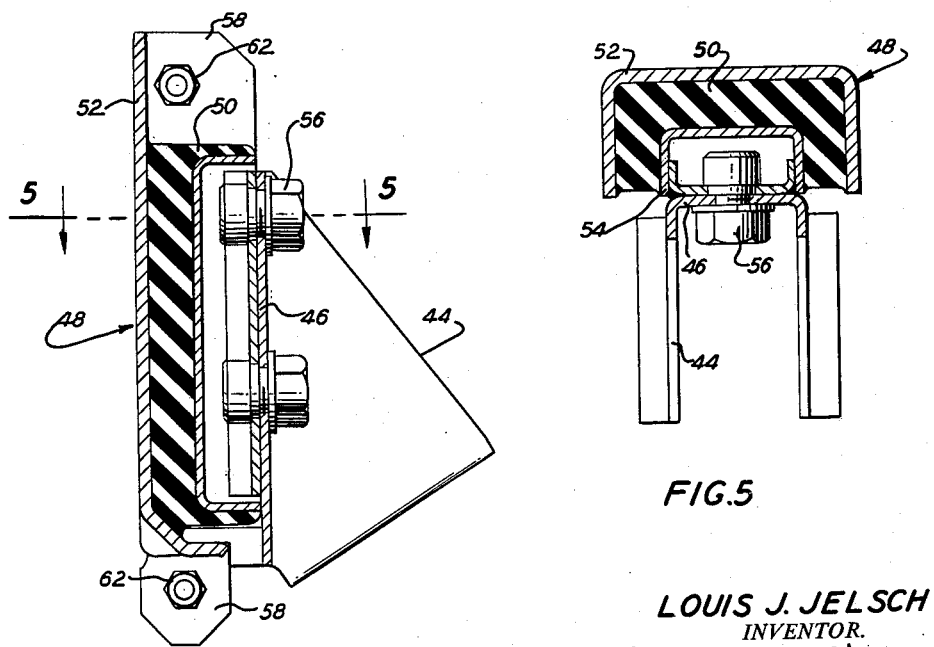
FIG.4
FIG.5
LOUIS J. JELSCH
INVENTOR.
BY John R. Faulkner
Clifford J. Sadley
ATTORNEYS

United States Patent Office 3,078,103
Patented Feb. 19, 1963

3,078,103
ISOLATED CHASSIS FRAME MEMBER
FOR A VEHICLE
Louis J. Jelsch, Pontiac, Mich., assignor to Ford Motor Company, Dearborn, Mich., a corporation of Delaware
Filed Jan. 4, 1960, Ser. No. 109
2 Claims. (Cl. 280—96.2)

The present invention relates to automotive vehicles and more particularly to the chassis construction of such vehicles.

The reduction of noise and vibrations that are transmitted to the passenger compartment of an automobile has long been recognized by engineers as a desirable achievement. In conventional vehicles employing separate body and chassis frame members, it is customary to use rubber cushions at the points where the body is bolted to the frame. In that type of construction the engine and unsprung members of the vehicle are mounted on the frame and the rubber mounts isolate operating sounds created by such components from the body.

The present trend in automotive design is toward unit type bodies where the frame is integral with the body and is formed of body sheet metal. Such construction provides a more rigid vehicle, however, it is more difficult to isolate objectionable vibrations originating in the engine and suspension from the body.

Therefore, it is the principal object of this invention to provide an improved vehicle construction which is characterized by its quietness of operation and is particularly adaptable to unit body automobiles.

It is a further object of the present invention to provide an independent cross frame member which is secured through rubber mounts to the integral frame of a vehicle having a unit type body and on which front suspension members and the engine are supported.

More specifically, the present invention provides a front cross frame member having rubber mounts by which it is connected to the upper and lower side rails of the integral frame of an automotive vehicle. This isolated cross frame member carries the upper and lower support arms for the front wheels as well as the engine's front mounts.

These and other objects of the present invention will become apparent from the following description and the accompanying drawings, wherein:

FIGURE 1 is a perspective view of the isolated cross frame member shown in association with the integral frame of an automobile, the latter being in phantom.

FIGURE 2 is a front elevational view partly in section of one end of the cross frame member.

FIGURE 3 is an end view corresponding to FIGURE 2.

FIGURE 4 is an elevational view in section of the rubber mount disclosed in FIGURE 2.

FIGURE 5 is an elevational view taken along section lines 5—5 of FIGURE 4.

Referring now to the drawings for a more detailed description, wherein like reference numerals identify like parts throughout the various views, an isolated cross frame member 10 constructed in accordance with the preferred embodiment of the present invention is disclosed in FIGURE 1.

Cross frame member 10 is fabricated in accordance with conventional frame member construction and may be either a channel or box-shaped section depending upon the loads encountered. The frame member 10 is located transversely of the vehicle at its front end beneath the engine compartment. The central region of frame member 10 is bowed as at 12 and is provided with brackets at 14 which are situated at the edge of the bowed portion 12. The brackets 14 carry rubber blocks upon which the front of the vehicle engine is mounted and the bowed portion 12 permits the member 10 to pass under the crankcase of the engine (not shown).

The outer ends of frame member 10 are provided with tower-like cylindrical pieces 16 which form the upper spring seats for helical springs 18. Springs 18 constitute the spring suspension members for the independent suspension of the front wheels, one spring being provided for each wheel.

A lower support arm 20 also forms part of the suspension for the front wheels and has a seat to receive the lower end of the spring 18. Arm 20 is of generally A-shape having a ball joint 21 at its apex by which the wheel spindle structure 22 is pivotally supported. Spindle 22 rotatably carries a road wheel 24 which is shown in dotted line form.

The inner ends of the A-shaped lower support arm 20 are pivotally mounted. The rearmost leg of the support 20 is secured by a pin-type mounting to frame member 10 and is situated inwardly and slightly rearwardly of the spindle 22. The front leg of support 20 is provided with a rubber bushing mount 26 for securing to the integral frame of the vehicle. Bushing 26 is situated some distance inwardly and forwardly of the spindle 22. Because of the geometry of the support 20, the pin mount of its rear leg carries much greater loads than the bushing 26.

The upper end of spindle 22 is provided with a ball joint 28 to pivotally connect it to an upper support arm 30. A pivot support member 32 is welded to the upper end of the tower member 16. The inner ends of arm 30 are pinned through conventional bushings to channel-shaped brackets 34 which are welded to the supporting member 32.

A rubber cushion 36 is secured to the lower support arm 20, and is operatively situated relative to a bracket 38 attached to the lower end of the tower member 16. This construction provides a cushion stop in the event of extreme jounce deflection of the wheel supporting structure.

The support member 32 which carries the pivot brackets 34 for upper support arm 30 has a central portion extending across the open upper end of the tower 16 and is indicated generally by the reference numeral 40. It forms a connection for the upper end of a shock absorber 42 which is of the direct acting hydraulic plunger type. Shock absorber 42 is concentrically disposed within the spring 18 and finds its lower connection in arm 20 at the center of the spring seat.

A pyramid-shaped structural member 44 is welded to the shock absorber support 40 and presents an inclined mounting face which is directed inwardly. This face is indicated by the reference numeral 46 and provides an attaching surface for a rubber mounting block 48, the construction of which is best seen in FIGURE 5. The rubber mounting block 48 is of the shear type and comprises a channel-shaped rubber body 50 to which a channel-shaped outer sheet metal member 52 is bonded. A box section 54 formed of two channel members is bonded to the inner surface of the block 50. Holes are provided in the box member 54 which complement holes provided in the face 46. These complementary holes receive attaching means such as bolts 56 for securing the rubber block assembly 48 to the super structure of the tower 16.

The cushion block 48 is provided with mounting flanges 58 to which a mounting bracket 60 is bolted, as indicated at 62. The mounting bracket 60 is welded at its upper end to the upper side rail 64 of the integral frame of the vehicle, and is similarly joined at tis lower end to the vehicle's lower side rail 66.

Referring to FIGURE 1, the integral frame construction is shown in phantom lines. In that view it can be seen that the forward ends of the upper and lower side rails 64, 66 are joined by a box-shaped frame structure which is comprised of upper and lower cross frame members 68 and 70 that join the upper and lower side rails respectively. The box is closed by a pair of vertical frame members 72 for the left and right hand sides.

Reviewing the foregoing described structure, it is seen that the cross frame member 10 has its attachment to the integral frame of the body by means of the rubber mounts 48 and carries the upper and lower support arms 30, 20 for the front wheels as well as the front engine mount. Any noise associated with these components will not be transmitted to the body of the vehicle, but rather will be deadened within the body of the rubber 50.

By being connected to both the upper and lower side rails, exceptional stability is achieved. The shear type rubber mount 48 is so situated in relation to the upper ball joint 28 that fore and aft loads are taken directly into the crossed frame member 10. Thus, no tendency to rotate member 10 is encountered. The inclined shear type rubber mounts 48 interposed between the opposite ends of the cross member 10 and the body structure adequately support the forces involved as well as dampen vibrations encountered. Due to the geometry of lower support arm 20, the rubber bushing 26 will constitute sufficient noise deadener at that point of connection to the body.

The foregoing description constitutes the preferred embodiment of the present invention. As noted, the isolated cross frame member is particularly suited to unit body construction, however, it will be readily appreciated that it is also adaptable to vehicles having separate frame and body, therefore in the following claims, references to frames are intended to encompass frames of either the integral or separate type unless otherwise indicated.

Other variations and modifications of the present invention may occur to those skilled in the art which will come within the scope and spirit of the following claims.

What is claimed is:

1. In a motor vehicle having a body and a frame integrally connected to said body, said frame having upper and lower side rails, the combination of a resiliently mounted cross frame member, said cross frame member having tower-like outer portions, super structure welded to said tower portion, resilient blocks secured to said super structure, a bracket connecting said upper and lower side rails and said resilient block, upper and lower wheel support arms pivotally secured to said cross frame member, a wheel support having ball joints at its upper and lower ends, said joints being connected to said upper and lower wheel support arms, a resilient engine mount on said cross frame members, said joints being in the same approximate vertical plane as the bracket connecting the upper and lower side rails.

2. A motor vehicle having a body and a frame integrally formed within said body, said frame having two laterally spaced apart sets of upper and lower side rails, the upper and lower side rails of each set having portions vertically and horizontally spaced apart, vertically oriented bracket means interconnecting said portions of said side rails of each set, a cross frame member disposed transversely with respect to said side rails and having upstanding end portions adjacent to said portion of said lower side rails, second bracket means secured on to the top of said cross frame member end portions, resilient electomeric block means secured to and interposed between said first mentioned bracket means and said second bracket means, said block means having shear planes inclined upwardly and outwardly, upper suspension arms pivotally connected to said frame end portions adjacent said second bracket means, lower suspension arms pivotally connected to said cross frame member, coil springs positioned beneath said second bracket means and interposed between said frame end portions and said lower arms.

References Cited in the file of this patent

UNITED STATES PATENTS

| | | |
|---|---|---|
| 2,228,107 | Best | Jan. 7, 1941 |
| 2,611,627 | Reynolds | Sept. 23, 1952 |
| 2,793,048 | Adloff | May 21, 1957 |
| 2,828,958 | Hirst | Apr. 1, 1958 |
| 2,837,348 | Muller | June 3, 1958 |
| 2,939,720 | Wroby | June 7, 1960 |
| 2,972,498 | Kelley | Feb. 21, 1961 |

FOREIGN PATENTS

| | | |
|---|---|---|
| 498,121 | Great Britain | Jan. 3, 1938 |